May 4, 1965
L. S. WILLIAMS
3,181,634
WEIGHING SCALES
Filed Dec. 20, 1962
3 Sheets-Sheet 3
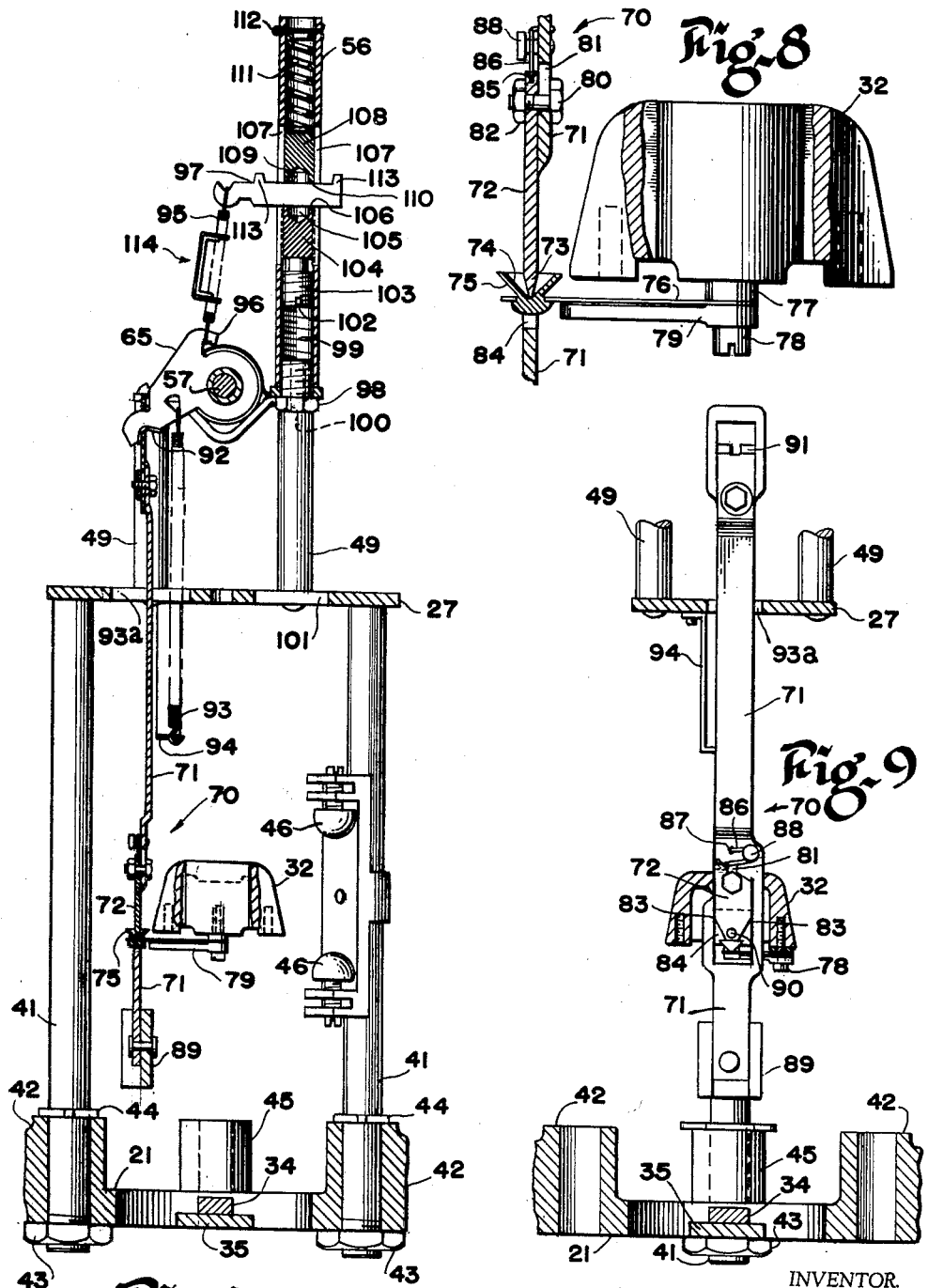
INVENTOR.
LAWRENCE S. WILLIAMS
BY
Marshall, Wilson, Blick & Yeasting
attorneys United States Patent Office 3,181,634
Patented May 4, 1965

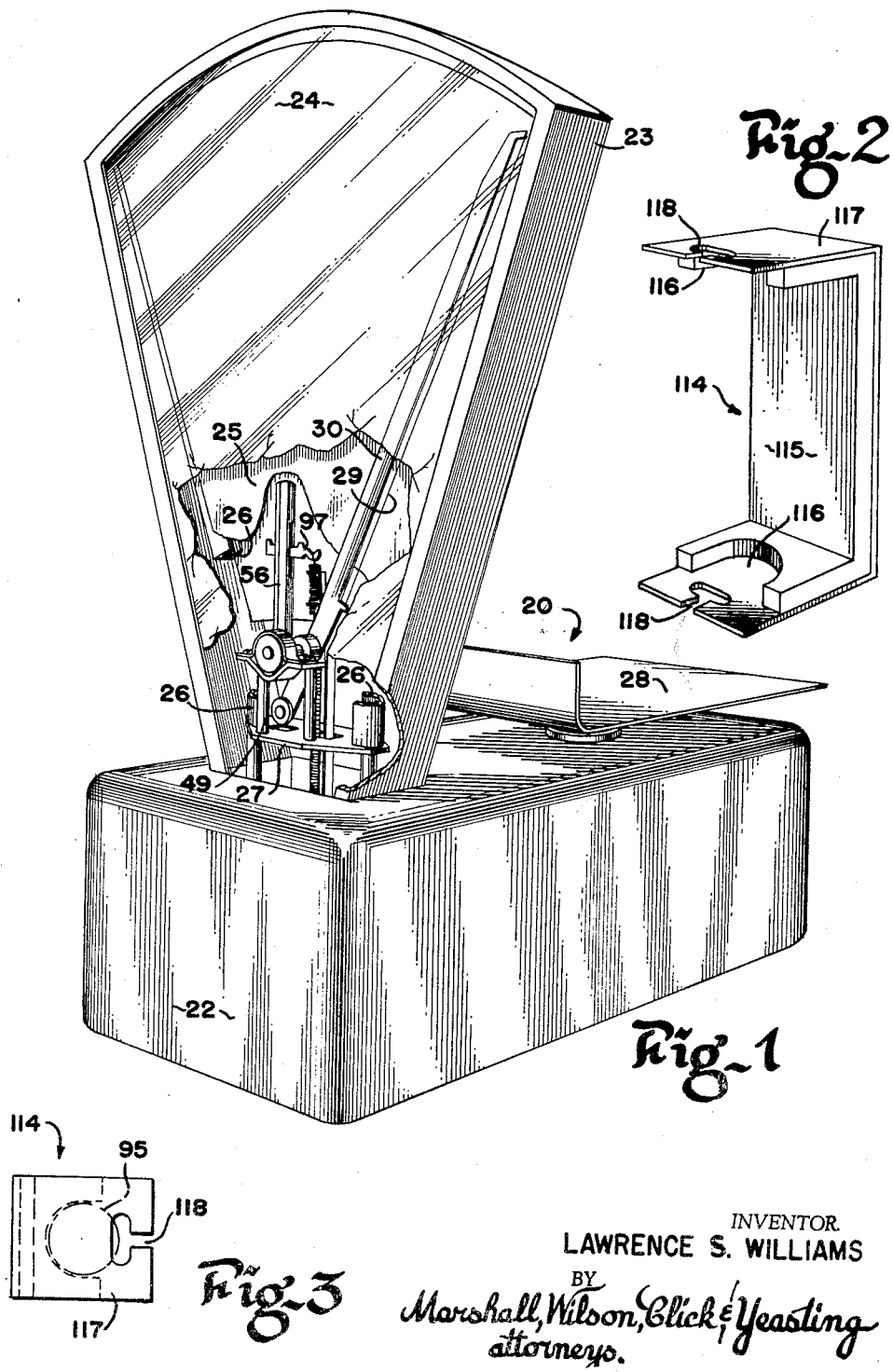

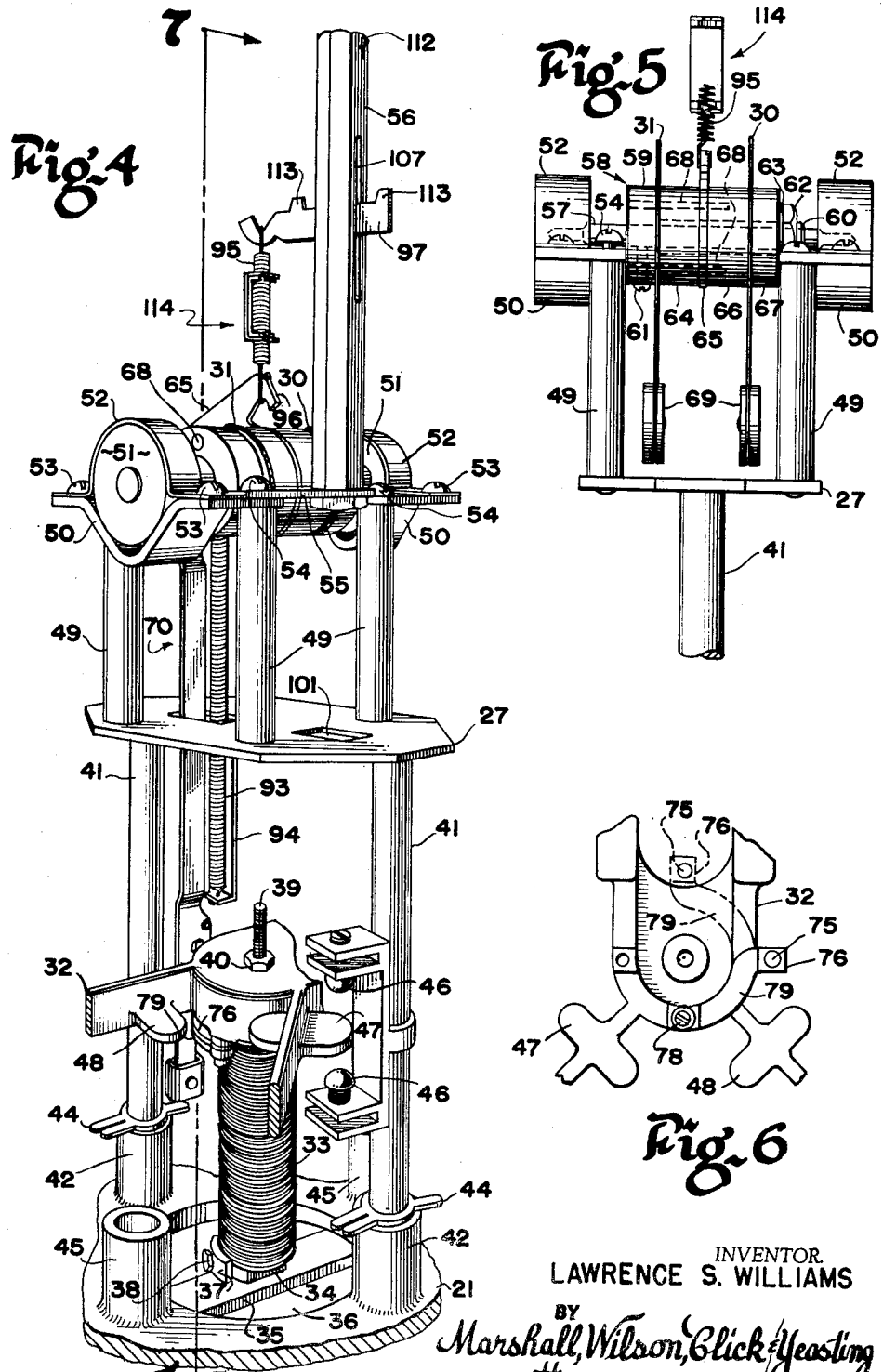

3,181,634
WEIGHING SCALES
Lawrence S. Williams, Toledo, Ohio, assignor to Toledo Scale Corporation, Toledo, Ohio, a corporation of Ohio
Filed Dec. 20, 1962, Ser. No. 246,026
16 Claims. (Cl. 177—169)

This invention relates to weighing scales and more particularly to improved fan scales.

Heretofore it has been known to drive the indicator in an over-under scale, as shown in U.S. Patent No. 2,937,863 issued May 24, 1960 to Harlan A. Hadley, by means of a crank drive. Such a drive, although it has superior simplicity, produces a nonlinear indicator travel, which can be tolerated in an over-under scale because the indicator travel is only about ten degrees at most and, if desired, the simple over-under chart can be calibrated to compensate for the nonlinear travel of the indicator. Such a drive has never been used in a fan spring scale because the indicator travel in such a scale may be sixty degrees and fan charts are too complicated to calibrate each individually for a particular scale. Such a drive has been used in a fan pendulum scale as shown in U.S. application Serial No. 225,298 filed September 21, 1962 in the name of F. C. Carroll et al., correcting or calibrating devices acting in conjunction with the pendulum being utilized to insure that equal increments of load upon the scale cause uniform travel of the scale's indicating means. Such correcting or calibrating devices cannot be used in a fan spring scale, because of the absence of a pendulum to be adjusted, and are in themselves not satisfactory, because by unbalancing the indicator they add to the friction in the indicator drive. Hence, fan spring scales with crank driven indicators and fan pendulum scales with satisfactory calibrating means for adjusting the scales' sensitivities are unknown.

The objects of this invention are to improve fan weighing scales, to provide a fan spring scale with a crank driven indicator having means for correcting the non-linearity of indicator travel caused by the crank, to provide resilient calibrating means for adjusting the sensitivities of fan scales, to improve resilient calibrating means for adjusting the sensitivities of weighing scales, to provide a fan spring scale with a crank driven indicator having a large yet linear indicator travel, and to improve crank drives for indicators in spring scales.

One embodiment of this invention enabling the realization of these objects is a fan spring scale having an indicator driven by a bell crank and a strut which connects the bell crank to the weighing scale's lever. The strut is connected to the lever through a quick-disconnect device and to the bell crank through a push connection, there being resilient means provided to keep the push connection connected whenever the strut moves away from the bell crank.

The crank drive for the indicator produces a nonlinear indicator travel which cannot be tolerated because of the large indicator travel (60 degrees) required. Resilient calibrating means are provided to correct such nonlinear travel. The sensitivity of the weighing scale at its zero, one-quarter, one-half, three-quarter, and full capacity positions is adjusted by applying suitable harmonic correction effects which are equal and opposite to the errors inherent in the scale, the correction effects being produced by the adjustable resilient calibrating means which is attached to the bell crank.

In accordance with the above, one feature of this invention resides in providing a fan spring scale with a crank driven indicator having a large yet linear indicator travel, i.e., large in the order of sixty degrees, in contrast to the small crank driven nonlinear indicator travel in over-under scales which is in the order of ten degrees.

Another feature resides in providing fan scales with resilient calibrating means for adjusting the sensitivities of the scales.

Still another feature resides in the superior simplicity of the resilient calibrating means as applied to weighing scales in general, the quarters corrector being particularly simple and comprising a self-locking, U-shaped clip by means of which the number of active spring coils in the resilient calibrating means are easily varied to vary the spring rate of the calibrating means.

A further feature resides in the quick-disconnect device which expedites wedding housing and base assemblies and requires no adjustment.

Another feature resides in the push connection between the strut and the bell crank which eliminates play in the system in contrast to the play in prior push-pull connections such as that between the strut and the crank arm shown in the above U.S. Patent No. 2,937,863.

The above and other objects and features of this invention will be appreciated more fully from the following detailed description when read with reference to the accompanying drawings wherein:

FIG. 1 is a perspective view of a fan spring weighing scale with parts broken away to reveal part of the mechanism in the interior, such mechanism being shown in zero load position;

FIG. 2 is an enlarged perspective view of a part of the mechanism shown in FIG. 1;

FIG. 3 is an end elevational view of the device shown in FIG. 2;

FIG. 4 is an enlarged, fragmentary perspective view of part of the mechanism shown in FIG. 1 as seen from a position to the right of the scale as viewed in FIG. 1, the mechanism being shown in one-half capacity position;

FIG. 5 is a fragmentary elevational view as seen from a position to the right of the mechanism as viewed in FIG. 4;

FIG. 6 is a fragmentary plan view of a part of the mechanism shown in FIG. 4 as seen looking up toward such mechanism;

FIG. 7 is a vertical sectional view taken substantially along the line 7—7 of FIG. 4 with the mechanism being shown in zero load position;

FIG. 8 is an enlarged view of a portion of the device shown in FIG. 7; and

FIG. 9 is a view generally similar to FIG. 7 with the mechanism rotated ninety degrees to provide side indication.

Referring to the drawings, a fan spring scale 20 includes a base 21 enclosed by a base housing 22 which supports a chart housing 23 extending upwardly therefrom. The chart housing defines a pair of window openings for front and back indication which are closed by glass windows 24 suitably supported by the chart housing and one of which is shown in FIG. 1. Means for supporting a glass window in the chart housing of a fan scale are shown in the above U.S. application Serial No. 225,298. A stationary chart 25 is viewed through each of the windows, each of the charts 25 being carried by its respective frame 26 carried in turn on a horizontal plate 27. Hence, as hereinafter described, rotation of the horizontal plate 27 about a vertical axis through ninety degrees to change from front and back indication to side indication or vice versa rotates the charts 25 correspondingly.

The scale 20 functions like any ordinary fan scale, i.e., the weight of an article placed upon a platter 28, operatively connected to weighing mechanism hereinafter described, is indicated by a reading line 29 on a load responsive indicator 30 stretched adjacent one of the charts 25 and also by a similar reading line not shown on a load responsive indicator 31 (FIGS. 4 and 5) adjacent the other one of the charts 25, and the value of such article, computed in accordance with such weight and the price per unit weight of such article, also is indicated in two places by the indicators 30 and 31 on their respective charts 25. Price legends (not shown) on the charts 25 and on the indicators 30 and 31 are used in the usual way as a means to select the proper columns of value figures on the charts which correspond to the price of the article being weighed. The indicators 30 and 31 move together as one across the faces of the charts as is well known in the art to provide identical indications from the front and back of the chart housing 23.

The force of gravity acting on a load placed upon the platter 28 is transmitted to a first order lever 32 fulcrumed on the base 21. A lever similar to the lever 32 is shown and described in detail in U.S. Patent No. 2,895,726 entitled "Ball Bearing Scale Pivots" and issued to L. S. Williams on July 21, 1959. Also, an operative interconnection for the platter 28 and lever 32 is shown in such patent. Since the lever 32 is a first order lever, load upon the platter 28 causes the end of the lever which is remote from the platter, i.e., the end of the lever 32 shown in FIG. 4, to move upwardly. These load forces acting on the lever 32 are transmitted to a load counterbalancing spring 33. The lower end of the spring 33 is rigidly connected to a block 34, carried on a narrow plate 35 spanning an opening 36 in the base 21, by means of a clamp 37 which is forced toward the block 34 by a screw 38 extending through the clamp and threaded into the block, the spring 33 being pinched between the block and the clamp. The upper end of the spring 33 is rigidly connected to the lever 32 by similar means, the respective block at the upper end of the spring 33 being carried by a threaded rod 39 and held in place by means of a pair of nuts 40 (only one shown) one on the threaded rod on top of the lever 32 and one on the threaded rod underneath the block.

The horizontal plate 27 is carried atop two posts 41 which fit into two hollow bosses 42 on the base 21, the bosses 42 being 180 degrees apart. The lower ends of the posts 41 are threaded and extend from the bosses 42 as shown in FIG. 7, there being nuts 43 on such threaded post ends which draw clips 44 on the posts 41 against the tops of the bosses 42 to hold the posts in place. The clips 44 are a low cost way of forming shoulders on the posts. Auxiliary bosses 45 on the base 21 receive the posts 41 when the posts are rotated about a vertical axis through 90 degrees when changing from front and back indication (FIGS. 1-8) to side indication (FIG. 9). Stops 46 on one of the posts 41 limit movement of the lever 32 by engaging a finger 47 on the lever 32. When the posts 41 are positioned for side indication (FIG. 9), the stops 46 cooperate with a finger 48 (FIG. 4) on the other side of the lever 32.

The horizontal plate 27 carries four posts 49 which are so arranged in spaced pairs that each pair can support a bearing bracket 50 which receives a ball bearing 51 that is held in its bracket by means of a bearing strap 52. This mounts the ball bearings 51 in spaced relationship. The straps 52 are attached to the brackets 50 by means of screws 53 and the brackets 50 are attached to the posts 49 by means of screws 54, the left hand screw 54 as viewed in FIG. 5 functioning additionally to attach a plate 55 (FIG. 4) to the respective post 49, such plate 55 being removed from the device as illustrated in FIG. 5 so that it does not conceal mechanism behind it and being shown in FIG. 4 supporting a calibrator tube 56.

A shaft 57 is journaled in the ball bearings 51 and it carries a T-shaped bushing 58 having a head 59 and an elongated body with a threaded end 60, a set screw 61 securing the bushing 58 to the shaft 57 for rotation therewith. The elements of the indicator assembly are packed on the bushing 58 and are forced toward the bushing head 59 by a nut 62 on the threaded bushing end 60 which nut is separated from such elements by a washer 63, such elements being, in their order from left to right in FIG. 5, the indicator 31, a spacer 64, a bell crank 65, a spacer 66, the indicator 30, and a spacer 67. Two pins 68 extending axially through the bushing head 59, the indicator 31, the spacer 64 and the bell crank 65, and into the spacer 66 fix the angular relationship between the indicator 31 and the bell crank 65, the indicator 30 being adjusted about the axis of the shaft 57 so that both indicators indicate the same thing at any one time (simultaneous front and back indication). Balance weights 69 are carried on the lower ends of the indicators 30 and 31. The indicator shaft 57 is crank-driven by the bell crank 65, the indicators 30 and 31 turning together as one with the bell crank 65 about the axis of the shaft 57.

The bell crank 65 is driven by the lever 32 through a strut 70 having an elongated body member 71 and a quick-disconnect strut member 72. The quick-disconnect member 72 is mounted to slide on the longitudinal axis of the elongated member 71 and has a cone-pointed pivot end 73 which is received in a conical depression 74 in a bearing 75 riveted (bottom of bearing 75 fuctions as a rivet) to a resilient strut leaf 76 extending from a boss 77 on the lever 32 and held on the boss by means of a screw 78. Slightly spaced from and below the resilient strut leaf 76 is a rigid backing 79 also secured to the boss 77 by means of the screw 78, a drop or so of silicone fluid being placed in the space between the resilient strut leaf 76 and the rigid backing. The resilient strut leaf prevents shock damage to the cone-pivot 73 and bearing 75 and to a knife pivot at the upper end of the strut 70 to be described hereinafter and is damped by the silicone fluid. As shown in FIGS. 4 and 6, the resilient strut leaf 76 and the rigid backing 79 curve around part of the counterbore spring 33 to position the bearing 75 closely adjacent the spring 33. When changing from front and back indication to side indication, the resilient strut leaf 76 and the rigid backing 79 are changed to their positions shown in broken lines in FIG. 6. As above described, this change also requires removing the posts 41 from the bosses 42 and placing them in the auxiliary bosses 45 as shown in FIG. 9. This sets up all the parts, as shown in FIG. 9, for side indication, except the chart housing 23 (FIG. 1) which is turned correspondingly. Means for attaching a chart housing to a base housing in several positions for indicating from several angles is shown in U.S. Patent No. 2,642,277 issued June 16, 1953 to M. A. Weckerly.

When changing the resilient strut leaf 76 and the rigid backing 79 from their solid line positions to their broken line positions shown in FIG. 6 or vice versa, the quick-disconnect member 72 is operated to disconnect and then reconnect the strut 70 to the bearing 75. One of the features of the fan scale resides in the quick-disconnect device which expedites wedding the housing and base assemblies with no adjustment required. The quick-disconnect member 72 is slidably mounted on the elongated strut member 71 by means of a shoulder screw 80 which extends through an oversize slot 81 in the elongated strut member 71 and is threaded into the quick-disconnect member 72, a lock nut 82 on the shoulder screw 80 being so adjusted that the quick-disconnect member 72 is slidable up or down without play on the elongated strut member 71. Shoulders 83 (FIG. 9) on the elongated strut member 71, along the vertical sides of a hole 84 in the member 71, act as guides which prevent turning of the quick-disconnect member 72 about the axis of the shoulder screw 80. The upper end of the quick-disconnect member 72 defines a groove 85 (FIG. 8) which receives the end of a spring 86 that has its other end secured in a hole 87 in the elongated strut member 71 and is wrapped around a pin 88 intermediate the spring ends. The spring 86 so resiliently urges the quick-disconnect member 72 downwardly that normally the shoulder screw 80 is bottomed in the slot 81 (FIG. 8). In such normal position, the cone-pivot 73 is received in the conical depression 74 in the bearing 75, the bearing 75 being located in the hole 84 in the strut member 71 in position to receive the cone-pivot 73. To adjust the assembly so that it is in neutral equilibrium on cone-pivot 73, there is provided a center-of-gravity weight 89 mounted on the bottom of the elongated strut member 71.

The quick-disconnect member 72 is operated to disconnect the cone-pivot 73 from its bearing 75 by hooking a tool through a hole 90 in the member 72 and pulling the member 72 upwardly in opposition to the spring 86. This slides the member 72 on the elongated strut member 71 and moves the shoulder screw 80 toward the upper end of the slot 81 and lifts the cone-pivot 73 out of the bearing 75. To reconnect the cone-pivot 73, the tool is used to again slide the member 72 in opposition to the spring 86, the cone-pivot 73 is positioned over the bearing 75, and the tool is removed. The spring 86 then pushes the cone-pivot 73 into the bearing 75.

The upper end of the strut member 71 carries a knife-edge pivot 91 which is received in a V-bearing 92 that is attached by an adhesive to an arm of the bell crank 65, the strut member 71 extending through a hole 93a in the horizontal plate 27. Upward movement of the lever end 32 at the counterforce spring 33 is transmitted through the cone-pivot 73 to the strut 70 which pushes its knife-edge pivot 91 against the V-bearing 92 to rotate the bell crank and the indicator shaft 57 clockwise about the axis of the indicator shaft as viewed in FIG. 7. The knife-edge pivot 91 is retained in the bearing seat when the strut 71 moves downwardly by means of a spring 93 extending between the above bell crank arm and a bracket 94 depending from the horizontal plate 27. This forms a push-connection which obviates play between the strut 70 and the bell crank 65, the spring 93 being stretched when the strut 70 drives the bell crank clockwise about the axis of the indicator shaft 57 as viewed in FIG. 7. Hence, the load forces acting on the lever 32 are transmitted to the load counterbalancing spring 33 as described above and the indicators 30 and 31 are driven by the lever 32 through the strut assembly and crank across the faces of the charts 25 as described above.

The crank drive described above produces a nonlinear indicator travel which cannot be tolerated in the fan scale 20 because the indicator moves through a large arc, i.e., about sixty degrees. This sixty degree arc which is not completely apparent from FIG. 1 because of the angle of the perspective view is conventional in fan scales and is shown in the above U.S. application Serial No. 225,298. This large arc makes the non-linear error so apparent that the scale would not be accurate enough to be practicable without the resilient calibrating means of the invention to correct such error. Such resilient calibrating means ensures that equal increments of load upon the scale 20 cause uniform travel of the scale's indicators 30 and 31.

The resilient calibrating means includes a corrector spring 95 which is hooked on a hook 96 on the bell crank 65 and on an end of a calibrator arm 97 carried by the calibrator tube 56. The spring 95 and the spring 93 are very weak relative to the counterforce spring 33 and, thus, do not enter into the weighing significantly. With no load upon the platter 28, the mechanism assumes its position shown in FIGS. 1 and 7 with the spring 95 extended and pulling on the bell crank 65 on a line which is at an acute angle with a vertical line from the axis of the indicator shaft 57 as viewed in FIG. 7. With a one-half capacity load upon the platter 28, the mechanism assumes its position shown in FIG. 4 with the spring 95 pulling on the bell crank 65 on a line which coincides with such vertical line from the axis of the indicator shaft 57. Hence, at one-half capacity the spring 95 does not apply a moment to the bell crank 65 and is in effect not in the calibrating system. With a full load upon the platter 28, the mechanism assumes a position such that the spring 95 is extended and pulls on the bell crank 65 on a line which is at the same acute angle from the vertical as shown in FIG. 7, except the spring pull is on the other side of the vertical from that shown in FIG. 7. That is, FIG. 7 shows the corrector spring 95 in its no-load position pulling on the bell crank 65 producing a moment and, as the strut 70 drives the bell crank 65 clockwise about the axis of the indicator shaft 57 as load is placed upon the scale, the spring 95 moves to its one-half capacity position (vertical) and, as the load is increased to full load, the spring 95 moves so that its line of action is to the right of the vertical as viewed in FIG. 7.

The corrector spring 95 produces an elastically applied force to the system which balances out the non-linear error caused by the action of the bell crank 65. Such nonlinear error forms a harmonic curve when plotted and the corrector spring 95 produces equal and opposite harmonic correction effects. Adjustment means in conjunction with the spring 95 adjust the sensitivity of the scale at its zero, one-quarter, one-half, three-quarter, and full capacity positions so that the indicators 30 and 31 point to accurate weight and value indicia and graduations.

The calibrator tube 56 is attached to the plate 55 by means of a screw 98 which is threaded on internal threads 99 in the tube 56 and that has a longitudinal opening 100 for the reception of a tool which is inserted through a hole 101 in the plate 27 and through the opening 100 in the screw 98. The tool is received in a kerf 102 in an adjustment screw 103 which also is threaded on the internal threads 99. When the adjustment screw 103 is moved upward within the tube 56, it pushes a slidable plug 104 upwardly within the tube. The slidable plug 104 is provided with a depression 105 which forms a shoulder 106 upon which rests the bottom of the calibrator arm 97, the arm 97 extending out from either side of the tube 56 through slots 107. A second slidable plug 108, which is identical to the plug 104 except it is in up-side-down orientation, bears on the top of the calibrator arm 97 and is provided with a depression 109 which forms a shoulder 110. A coil spring 111 within the tube 56 is compressed between a pin 112 and the second slidable plug 108. When the adjustment screw 103 is moved upward within the tube 56, the first slidable plug 104, the calibrator arm 97, and the second slidable plug 108 are pushed upwardly in opposition to the spring 111. When the adjustment screw 103 is moved downwardly within the tube 56, the spring 111 pushes the second slidable plug 108, the calibrator arm 97, and the first slidable plug 104 downwardly. The calibrator arm 97 is prevented from turning about the axis of the tube by being confined in the slots 107. This up or down adjustment of the calibrator arm 97 varies the magnitude of the elastic force applied by the spring 95 to vary the span of the scale (zero and full capacities), the spring 95 being indirectly connected to the lever 32 to affect the position of the lever 32 at any one load other than a one-half capacity load in accordance with how hard the spring 95 pulls on the bell crank 65. Such varying of the force does not change the position of the scale at one-half capacity because the corrector spring 95 does not apply a moment to the bell crank 65 at one-half capacity as above described.

The one-half capacity position of the scale is adjusted by inserting a tool between one or the other of fingers 113 on the calibrator arm 97 and the respective tube wall (friction holds the calibrator arm in place) and prying the calibrator arm 97 in one direction or the other (right or left as viewed in FIG. 7) to change the line of action (the angle) of the elastically applied force to set the scale to one-half capacity.

The one-quarter and three-quarter capacity positions of the scale are adjusted by changing the rate of the corrector spring 95 which is accomplished by changing the number of active coils in the spring 95 by means of a self-locking, U-shaped clip 114. The clip includes a rigid flat-bottomed, U-shaped member 115, having U-shaped openings 116 in the legs of the U, which supports a second flat-bottomed, U-shaped member 117 that is made from relatively thin material. The rigid member 115 reinforces the thin member 117. The legs of the second U-shaped member 117 are longer than the legs of the rigid U-shaped member 115 and are provided each with a generally key-hole shaped opening 118 located at the respective U-shaped opening 116. The clip 114 is attached to the corrector spring 95 by first unhooking the spring 95 from the hook 96 and the calibrator arm 97, then stretching the spring 95 at a first place to separate the spring wire, threading such wire through the narrow part or neck of one of the key-hole shaped openings 118, whereupon, on release of the wire, the spring 95 assumes the position shown in ghost lines in FIG. 3 with part of the spring coil on the outside of a leg of the U-shaped member 117 and part of the spring coil on the inside of such leg and received in the respective U-shaped opening 116 of the rigid member 115 as shown in FIG. 3, then stretching the spring at a second place to separate the spring wire, and repeating such procedure to attach the corrector spring 95 as shown in FIGS. 1, 4, 5 and 7. The corrector spring 95 then is rehooked on the bell crank 65 and on the calibrator arm 97. The coils of the corrector spring 95 between the legs of the clip 114 are inactive. Hence, by varying the number of spring coils caught between the legs of the clip 114 the rate of the spring 95 is varied to vary in turn the one-quarter and three-quarter capacity positions of the scale.

To insure that equal increments of load upon the platter 28 cause correct indications of the weight of the load by the indicators 30 and 31, test weights of one-quarter, one-half, three-quarter, and full capacities are placed upon the platter 28, and the above adjustments are made by trial and error until the scale is sealed in or straight lined at its zero, one-quarter, one-half, three-quarter, and full capacity positions.

The resilient calibrating means by correcting the otherwise nonlinear indicator travel provides the first known fan spring scale with a crank-driven indicator having a large yet linear indicator travel, i.e., large in the order of sixty degrees, in contrast to the small crank-driven nonlinear indicator travel in prior over-under scales which is in the order of ten degrees, provides the first known fan scale with resilient calibrating means for adjusting the sensitivity of the scale, and is an improvement over known resilient calibrating means by having superior simplicity as applied to weighing scales in general.

It is to be understood that the above description is illustrative of this invention and that various modifications thereof can be utilized without departing from its spirit and scope.

Having described the invention, I claim:

1. A fan spring weighing scale comprising, in combination, spring weighing mechanism, a stationarily mounted chart, a pivotally mounted indicator movable across the face of the chart, crank drive means operatively connecting the weighing mechanism to the indicator, resilient calibrating means operatively connected to the indicator, and means for selectively adjusting the calibrating means to so adjust the sensitivity of the scale that the indicator has a linear travel.

2. A fan spring weighing scale according to claim 1 wherein the calibrating means includes a calibrator coil spring.

3. A fan spring weighing scale according to claim 2 wherein the sensitivity is adjustable at five capacity positions of the scale.

4. A fan spring weighing scale according to claim 3 wherein the sensitivity is adjustable at one-quarter and three-quarter capacity positions by varying the spring rate of the calibrator spring.

5. A fan spring weighing scale according to claim 4 wherein the sensitivity is adjustable at the one-quarter and three-quater capacity positions by means of a U-shaped clip, the legs of the U being so operatively connected to the calibrator spring that spring coils are caught between such legs and are thereby made inactive, whereby the spring rate is varied by varying the number of inactive spring coils caught between the legs.

6. A fan weighing scale comprising, in combination, weighing mechanism, a stationarily mounted chart, a pivotally mounted indicator operatively connected to the weighing mechanism and movable across the face of the chart, resilient calibrating means operatively connected to the indicator, and means for selectively adjusting the calibrating means to so adjust the sensitivity of the scale that the indicator has a linear travel.

7. In a weighing scale, in combination, a rotatably mounted indicator shaft, a bell crank on the shaft, a calibrator arm mounted for movement toward and away from the shaft, and a coil spring connecting the bell crank to the arm and applying an elastic moment force to the bell crank at all scale capacities except one-half capacity, said movement of the arm varying the magnitude of the elastic force to vary the span of the scale.

8. In a weighing scale in accordance with claim 7 wherein the calibrator arm also is mounted for movement in a direction perpendicular to said movement toward and away from the shaft for changing the line of action of the elastically applied force to vary the one-half capacity position of the scale.

9. In a weighing scale in accordance with claim 8 wherein the arm is mounted on a tube stationarily mounted adjacent the shaft and friction means within the tube holds the arm in its adjusted position.

10. In a weighing scale in accordance with claim 8 wherein means are provided for changing the spring rate of the spring to vary the one-quarter and third quarter capacity positions of the scale.

11. In a weighing scale in accordance with claim 10 wherein said means for changing the spring rate includes a U-shaped clip having legs between which coils of the spring are caught and thereby made inactive, whereby the spring rate is varied by varying the number of inactive spring coils caught between the legs.

12. In a weighing scale, in combination, weighing mechanism, a calibrator coil spring operatively connected to the weighing mechanism for applying an elastic force to the weighing mechanism, and a clip having legs between which coils of the spring are caught and thereby made inactive for adjusting the sensitivity of the scale at its one-quarter and three-quarter capacity positions by varying the number of inactive spring coils caught between the legs.

13. A weighing scale comprising, in combination, weighing mechanism, a rotatably mounted indicator shaft, a crank arm on the shaft, strut means connecting the weighing mechanism to the crank arm and including a push connection at the crank arm, the strut means pushing the crank arm when the strut means moves in a first direction and being disengageable from the crank arm when the strut means moves in the opposite direction, and resilient means for keeping the push connection engaged.

14. A weighing scale comprising, in combination, weighing mechanism including a pivotally mounted lever, a rotatably mounted indicator shaft, a crank arm on the shaft, a strut, cone-pivot means connecting the lever to the strut, push connection means connecting the strut to the crank arm, movement of the cone-pivot means toward the crank arm driving the crank arm through the push connection, and resilient means opposing movement of the push connection as driven by the cone-pivot means, whereby the push connection is kept engaged during its return movement.

15. A weighing scale comprising, in combination, weighing mechanism, a rotatably mounted indicator shaft, and means connecting the weighing mechanism to the shaft, said means including a strut having a first part, a second part and resilient means carried by one of the parts, the second part being movable relative to the first part in opposition to the resilient means for readily disconnecting the weighing mechanism from the shaft.

16. A weighing scale comprising, in combination, weighing mechanism, a rotatably mounted indicator shaft, and means connecting the weighing mechanism to the shaft, said means including a strut having a first part, a second part movable relative to the first part, a cone pivot on the second part, a bearing on the weighing mechanism receiving the cone pivot, and resilient means on the first part engaging the second part for urging the cone pivot into engagement with the bearing, whereby the strut is readily disconnected from the weighing mechanism by moving the second part in opposition to the resilient means to remove the cone pivot from the bearing.

References Cited by the Examiner

UNITED STATES PATENTS

| | | | |
|---|---|---|---|
| 642,321 | 1/00 | Gilfillan | 177—230 |
| 939,213 | 11/09 | Buckingham | 177—175 |
| 1,101,215 | 6/14 | Simonsson | 177—224 |
| 2,057,576 | 10/36 | Johnson | 177—234 |
| 2,659,594 | 11/53 | Eisner | 177—229 |

FOREIGN PATENTS 620,728  3/49  Great Britain.

ROBERT L. EVANS, *Primary Examiner.*
LEO SMILOW, *Examiner.*